(12) United States Patent
Stoltze et al.

(10) Patent No.: US 8,038,575 B2
(45) Date of Patent: Oct. 18, 2011

(54) SAFETY CONTROL FOR RELEASABLE BACKSTOPPING CLUTCH

(75) Inventors: David Pearson Stoltze, Brighton, MI (US); Jonathan Peter Cooksley, Farnham (GB)

(73) Assignee: Warner Electric Technology LLC, Braintree, MA (US)

( * ) Notice: Subject to any disclaimer, the term of this patent is extended or adjusted under 35 U.S.C. 154(b) by 573 days.

(21) Appl. No.: 12/175,995

(22) Filed: Jul. 18, 2008

(65) Prior Publication Data

US 2010/0016122 A1    Jan. 21, 2010

(51) Int. Cl.
*B60W 10/18* (2006.01)
(52) U.S. Cl. ............... 477/182; 192/12 B; 192/18 A
(58) Field of Classification Search ............ 477/182
See application file for complete search history.

(56) References Cited

U.S. PATENT DOCUMENTS 5,265,707 A * 11/1993 Abe et al. ............... 192/47
6,722,456 B2 * 4/2004 Hisada .............. 180/65.235

* cited by examiner

*Primary Examiner* — Edwin A Young
(74) *Attorney, Agent, or Firm* — Dykema Gossett PLLC

(57) ABSTRACT

A releasable backstopping clutch is provided with a safety mechanism to prevent uncontrolled release of the clutch. A support structure is fixed against rotation and releaseably coupled to the one of the inner or outer members of the backstopping clutch. The support structure inhibits rotation of the member when coupled to the member and permits rotation of the member when uncoupled from the member to release the clutch. A sensor is configured to generate a signal indicative of a characteristic associated with movement of the member and a controller is configured to cause recoupling of the support structure and the member if the characteristic meets a predetermined condition.

19 Claims, 2 Drawing Sheets

SAFETY CONTROL FOR RELEASABLE BACKSTOPPING CLUTCH

BACKGROUND OF THE INVENTION

1. Field of the Invention

This invention relates to releasable backstopping clutches and, more particularly, to a backstopping clutch assembly having a safety mechanism to prevent uncontrolled release of the clutch.

2. Disclosure of Related Art

In many motor driven systems, it is desirable to prevent or limit movement of system components in one direction. For example, mining operations typically use inclined conveyors to convey material to a surface location or other outlet. It is desirable to prevent or limit reverse movement of the conveyor in the event of a loss of power or a failure of a driveline component such as the motor or motors, gearboxes or couplings in order to prevent material from moving backwards on the conveyor and causing damage to the system and significant injuries to personnel operating the system.

Backstopping clutches are typically used to prevent reverse rotation of rotating system components. A backstopping clutch includes an inner member that is mounted to a shaft driven by one or more motors for rotation with the shaft about a rotational axis. An outer member is disposed radially outward of the inner member and is generally fixed against rotation through coupling with a fixed support structure such as a torque arm or gear box (which itself may be coupled to surrounding, fixed structures). A plurality of torque transmission members (e.g., rollers, sprags, etc.) are disposed radially between the inner and outer members. The torque transmission members and/or inner or outer members are shaped such that when the motor drives the shaft and inner member in one rotational direction, the torque transmission members assume a first position permitting relative rotation of the inner and outer members (i.e., permitting the inner member to freewheel). When the driven shaft and inner member are driven in the opposite rotational direction (e.g. by the force of the load of the material on a conveyor upon failure of a motor), the torque transmission members assume a second position and forcefully engage the inner and outer members and prevent the inner member and driven shaft from rotating relative to the fixed outer member.

Some backstopping clutches are releasable to enable easier servicing of the clutch and surrounding motor driven structures and to limit torque on the clutch and structures. In a releasable backstopping clutch, the support structure is releasably coupled to the outer member of the clutch. When the support structure is uncoupled from the outer member, the engaged outer and inner members of the clutch are permitted to rotate in the direction opposite the freewheeling direction.

Releasable backstopping clutches have not obtained widespread acceptance because releasing the clutch creates significant safety issues. In particular, if the clutch is released for a long enough period of time, the accumulated kinetic energy of the load may exceed the ability of the release mechanism to reengage and prevent further movement.

The inventors herein have recognized a need for a releasable backstopping clutch assembly that will minimize and/or eliminate one or more of the above-identified deficiencies.

SUMMARY OF THE INVENTION

The present invention provides a releasable backstopping clutch assembly.

A releasable backstopping clutch assembly in accordance with one embodiment of the present invention includes a backstopping clutch. The clutch includes an inner member and an outer member disposed radially outwardly of the inner member. The clutch further includes a torque transmission member disposed between the inner and outer members. In one embodiment of the invention, the inner and outer members comprises inner and outer races and the torque transmission member comprises a roller. One of the inner and outer members is freely rotatable relative to another of the inner and outer members in a first rotational direction. The torque transmission member is configured to engage the another member and inhibit rotation of the one member relative to the another member in a second rotational direction. The assembly further includes a support structure fixed against rotation and releasably coupled to the another member of the backstopping clutch. The support structure inhibits rotation of the another member in the second rotational direction when coupled to the another member and permits rotation of the another member in the second rotational direction when uncoupled from the another member. The assembly further includes a sensor configured to generate a signal indicative of a characteristic associated with movement of the another member of the backstopping clutch in the second rotational direction. The assembly further includes a controller configured to cause coupling of the support structure and the another member if the characteristic meets a predetermined condition.

A releasable backstopping clutch assembly in accordance with the present invention represents a significant improvement relative to conventional assemblies. The assembly permits a controlled release of the backstopping clutch that enables release of the clutch to allow servicing of the clutch and surrounding system and limit torque buildup, yet automatically halts movement of the clutch in response to conditions indicating potential safety concerns.

These and other advantages of this invention will become apparent to one skilled in the art from the following detailed description and the accompanying drawings illustrating features of this invention by way of example.

DETAILED DESCRIPTION OF EMBODIMENTS OF THE INVENTION

Figure 1:
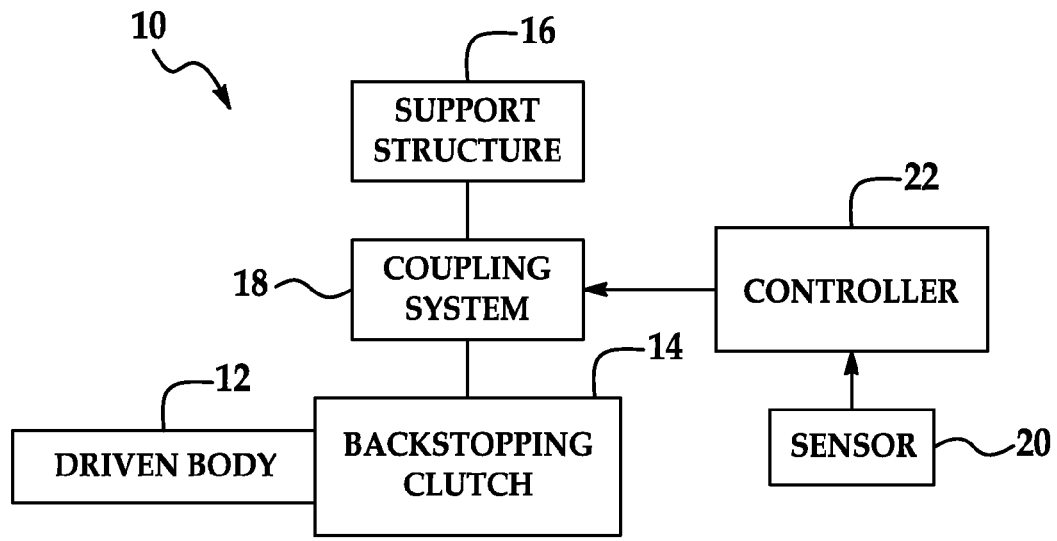
FIG. 1 is a diagrammatic view of a releasable backstopping clutch assembly in accordance with the present invention.

Referring now to the drawings wherein like reference numerals are used to identify identical components in the various views, FIG. 1 illustrates a releasable backstopping clutch assembly 10 in accordance with the present invention. Assembly 10 is provided to control rotational movement of one or more driven bodies 12 such as a shaft, pulley, etc. For example, driven body 12 may comprise a shaft in an inclined conveyor system that is driven by a motor. Assembly 10 permits rotation of driven body 12 in one rotational direction, but inhibits rotation of driven body 12 in an opposite rotational direction to prevent damage to the motor and/or conveyor system. Assembly 10 may include a backstopping clutch 14, a support structure 16, means for releasably coupling support structure 16 and clutch 14 such as coupling system 18, means for monitoring a characteristic associated with movement of clutch 14 such as sensor 20, and a controller 22.

Figure 3:
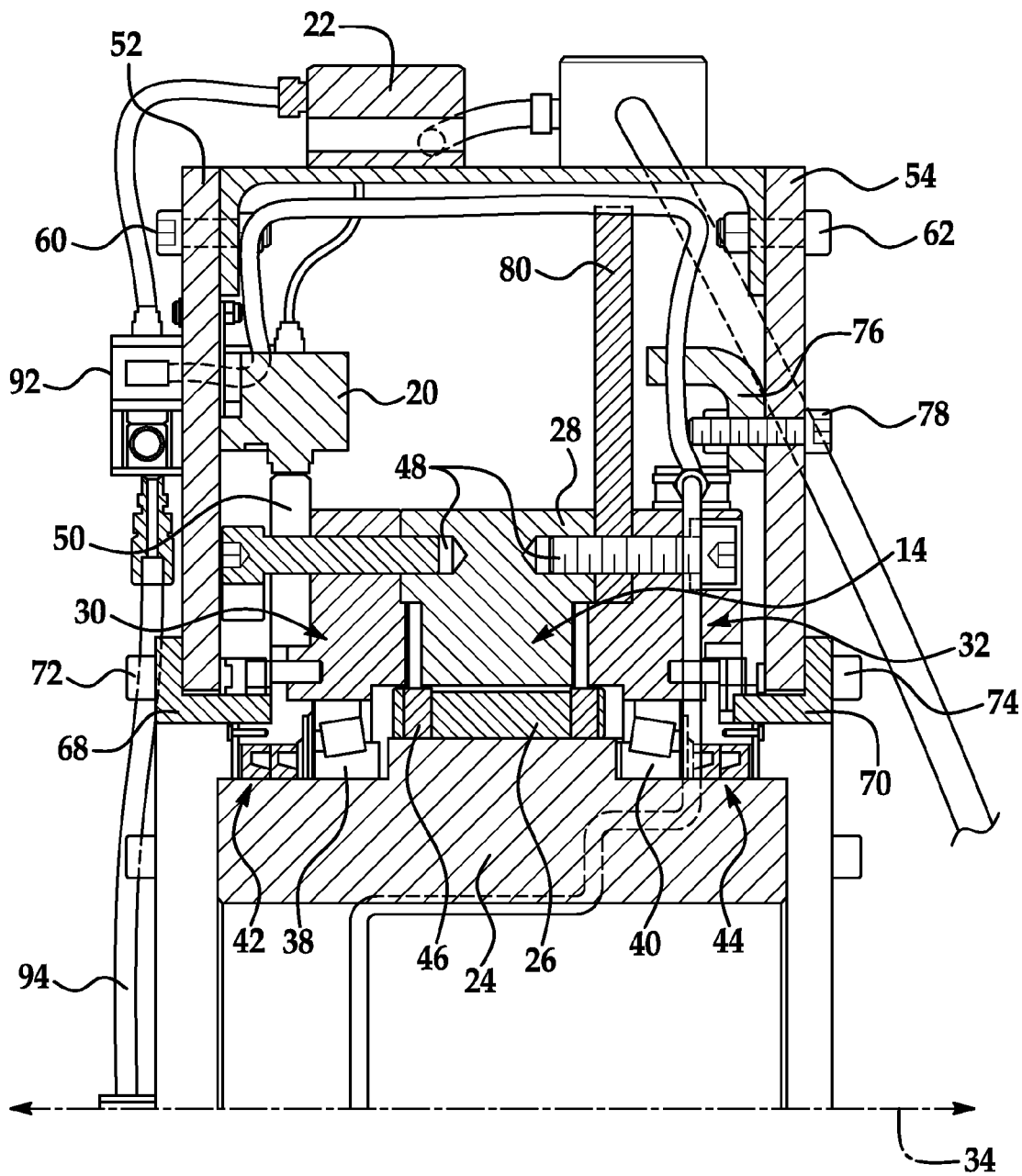
FIG. 3 is a cross-sectional view of a portion of the assembly in FIG. 2.

Clutch 14 is conventional in the art. Referring to FIG. 3, clutch 14 includes an inner member, an outer member and torque transmission members disposed therebetween. In the illustrated embodiment, clutch 14 comprises a roller clutch and the inner, torque transmission, and outer members comprise an inner race 24, rollers 26, and an outer race 28. It should be understood, however, that the structure of backstopping clutch 14 may vary and may include sprag clutches as well as clutches using a pivoting shoe configuration, a ratchet and pawl configuration or a pin and pocket configuration. Clutch 14 may also include end caps 30, 32.

Figure 2:
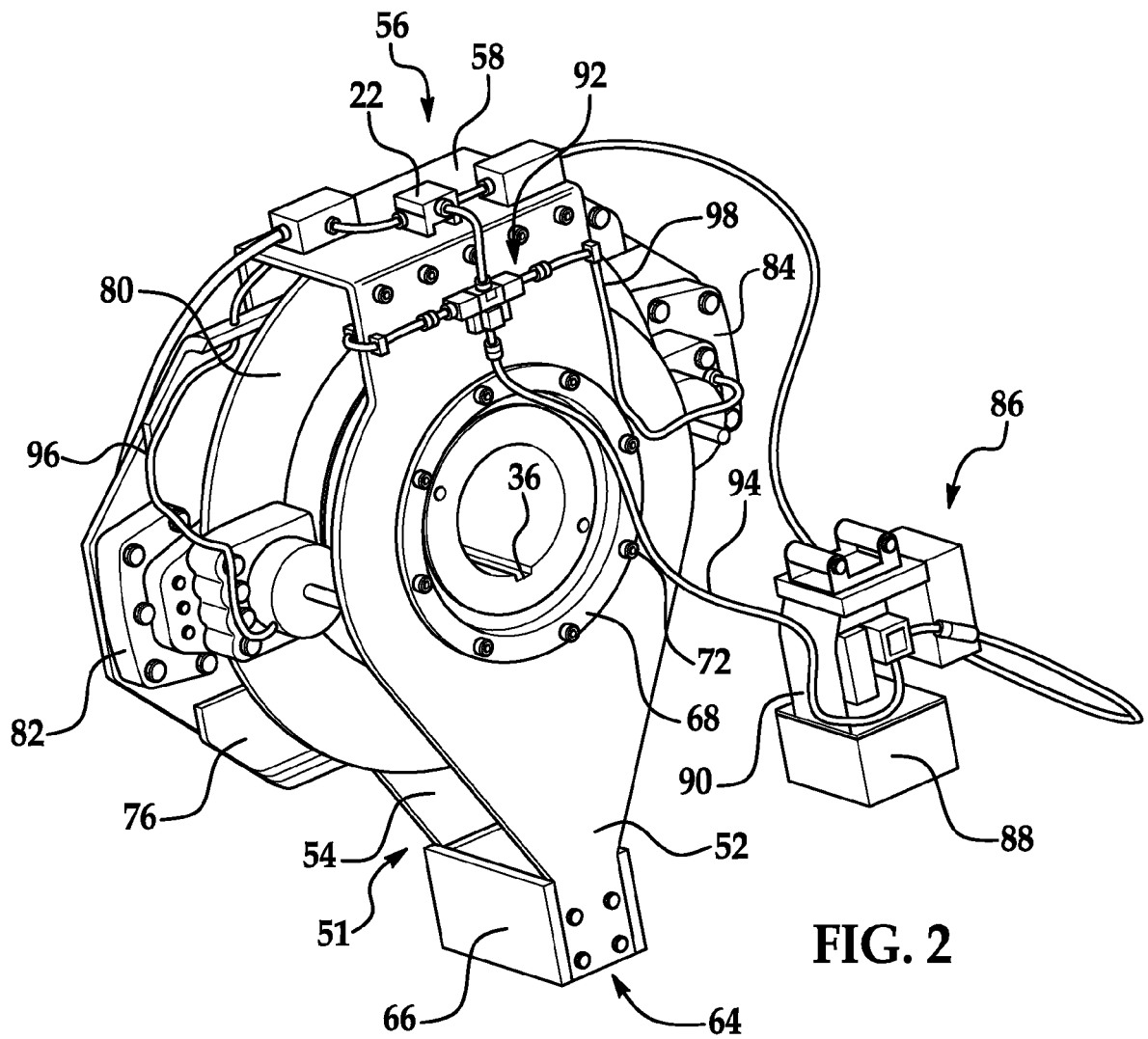
FIG. 2 is a perspective view of a releasable backstopping clutch assembly in accordance with one embodiment of the invention.

Inner race 24 provides a means for coupling clutch 14 to driven body 12 and provides structural support for the other components of clutch 14. Race 24 is annular and sized to receive driven body 12. When mounted on driven body 12, race 24 is disposed about an axis 34 of rotation of body 12. Referring to FIG. 2, race 24 may define a keyway 36 to align race 24 with body and rotatably couple race 24 and body 12. Referring again to FIG. 3, the outer diameter of race 24 may vary with reduced diameter portions at either axial end of race 24 defining shoulders configured to receive bearings 38, 40 and seals 42, 44.

Rollers 26 provide a means for rotatably coupling inner race 24 and outer race 28 and are conventional in the art. Rollers 26 are disposed radially between inner race 24 and outer race 28 and may be retained in position by a cage 46 or may be loose rollers. Rollers 26 may also be biased by springs (not shown) into engagement with or disengagement from outer race 28. Rollers 26 and/or the radially inner surface of outer race 26 are shaped such that rollers 26 assume a first position when inner race 24 rotates in one rotational direction to permit rotation of inner race 24 relative to outer race 28 (freewheeling) and rollers 26 assume a second position when inner race 24 rotates in the opposite rotational direction to prevent inner race 24 from rotating relative to outer race 28.

Outer race 28 transmits a braking torque to inner race 24 through rollers 26 when inner race 24 rotates in one of two directions of rotation. Outer race 28 is disposed radially outwardly of inner race 24 and rollers 26. In the illustrated embodiment, the inner diameter of race 28 varies and is greater proximate either axial end of race 28. Race 28 defines bores in each axial end configured to receive fasteners 48 used to secure end caps 30, 32 to race 28.

End caps 30, 32 provide structural support for clutch 14 and help to seal the internal components of clutch 14. End caps 30, 32 are disposed at either axial end of clutch 14 and are coupled to outer race 28 through fasteners 48. End caps are supported on bearings 38, 40, respectively. End cap 30 may define a plurality of teeth 50 on a radially outer surface for a purpose described hereinbelow.

Support structure 16 provides a path for reacting the torque from clutch 14 and driven body 12 upon engagement of races 24, 28 of clutch 14 into a fixed structure (not shown). In the illustrated embodiment, support structure 16 comprises a torque arm 51. Support structure 16 may alternatively comprise a gear box or another structure used to react braking torque. Further, although FIGS. 2-3 disclose a particular structure for torque arm 51, it should be understood that the structure of torque arm 51 will vary depending on the type of coupling system employed among other factors. Referring to FIG. 2, arm 51 includes two plates 52, 54 disposed on either axial side of clutch 14. Referring to FIG. 3, plates 52, 54 are coupled at one longitudinal end 56 by a U-shaped bracket 58 secured to plates 52, 54 by fasteners 60, 62. Referring again to FIG. 2, plates 52, 54 may also be coupled at an opposite longitudinal end 64 by a bracket 66. End 64 of arm 51 may be coupled to a stationary structure (e.g. to part of the support structure for an inclined conveyor). Plates 52, 54 are supported on annular bearing rings 68, 70 which are in turn supported on end caps 30, 32, respectively. Bearings rings 68, 70 are fastened to plates 52, 54 using fasteners 72, 74 and permit clutch 14 to rotate relative to torque arm 51 when torque arm 51 is uncoupled from clutch 14. Torque arm 51 also includes a plate 76 that extends transverse to plates 52, 54. Plate 76 may be coupled to plate 54 using fasteners 78 and provides a mounting structure for a portion of coupling system 18 as described hereinbelow.

Coupling system 18 is provided to couple outer race 28 of clutch 14 and support structure 16 to provide backstopping torque to clutch 14. Coupling system 18 also provides a means for releasing clutch 14 by uncoupling support structure 16 from clutch 14 to permit rotation of clutch 14. Although a particular a coupling system 18 is illustrated in FIGS. 2-3, it should be understood that a variety of conventional coupling systems could be employed to enable release of clutch 14. In accordance with the illustrated embodiment, system 18 includes a disc 80, a pair of calipers 82, 84 and a fluid delivery system 86. Coupling system 18 may be designed in part to act as a torque limiter that limits peak torques in the overall system and therefore reduces the size of components such as clutch 14 or the surrounding system in which assembly 10 is integrated.

Disc 80 provides a friction surface for engagement by calipers 82, 84. Disc 80 is coupled to outer race 28 of clutch 14 for rotation therewith. In particular, disc 80 is sandwiched between outer race 28 and end cap 32 and is configured to receive fasteners 48 extending through end cap 32 and outer race 28.

Calipers 82, 84 provide a means for engaging and disengaging disc 80 to couple and uncouple outer race 28 of clutch 14 and torque arm 51. Calipers 82 84 are mounted to either longitudinal end of plate 76 of torque arm 51 such that calipers engage disc 80 at diametrically opposite points. Calipers 82, 84 are conventional in the art and may include brake pads that are disposed on either side of disc 80. Calipers 82, 84 may further include springs that bias the brake pads into engagement with disc 80.

Fluid delivery system 86 provides selective fluid pressure to calipers 82, 84 to overcome the biasing force of the springs on the brake pads of calipers 82, 84 and thereby disengage calipers 82, 84 from disc 80 and uncouple support structure 16 from clutch 14. System 86 may include a fluid tank 88 for storage of hydraulic or pneumatic fluid, a pump 90 for drawing fluid from fluid tank 88 and a valve 92 for controlling delivery of fluid pressure to calipers 82, 84 as well as conventional fluid hoses 94, 96, 98. The pump 90 may be driven by an electric motor responsive to an automated or manual input to release clutch 14. The fluid tank 88, pump 90 and hose 94 are generally not permanently connected to valve 92 and may be coupled and uncoupled from valve 92 using quick connects for portability.

Sensor 20 provides an indication of the movement of outer race 28 of clutch 14 when support structure 16 is uncoupled from clutch 14 and clutch 14 is released. Sensor 20 generates a signal indicative of a characteristic associated with movement of outer race 28. For example, sensor 20 may generate a signal indicative of a change in position or distance travelled of outer race 28 or the speed of rotation of outer race 28. Sensor 20 may be mounted to plate 52 of torque arm 51 and may be spaced from teeth 50 of end cap 30. The movement of teeth 50 past sensor 20 provides an indication of the movement of outer race 28. It should be understood, however, that sensor 20 could be located in a variety of locations proximate outer race or another member of rotating with the outer race (e.g., including the driven body 12) with similar effect. Sensor 20 may comprise a Hall effect sensor or other conventional sensor. The signal generated by sensor 20 is provided to controller 22. Sensor 20 may include an encoder to encode the signal in a conventional manner prior to transmission to controller 22.

Controller 22 controls coupling system 18 (and particularly valve 92 in the illustrated embodiment) responsive to the signal generated by sensor 20. Controller 22 may comprise a programmable microprocessor or microcontroller or may comprise an application specific integrated circuit (ASIC). Controller 22 may include a central processing unit (CPU) and an input/output (I/O) interface through which controller 22 may receive a plurality of input signals including signals from sensor 20 and generate a plurality of output signals including a control signal for valve 92. Controller 22 determines whether the characteristic associated with movement of outer race 28—as indicated by the signal from sensor 20—meets a predetermined condition. For example, where the signal generated by sensor 20 is indicative of the rotational speed of outer race 28, controller 22 may compare the speed to a threshold value. If the speed exceeds the threshold value, controller 22 would generate a control signal to close valve 92 and prevent fluid pressure from flowing to calipers 82, 84. As a result, calipers 82, 84 would reengage disc 80 and recouple support structure 16 to clutch 14. The predetermined condition (or threshold value) may be programmed into controller 22 and may be based on a wide variety of factors including, for example, the dynamic braking capacity of clutch 14 and, for an inclined conveyor system, the length of the conveyor belt, the slope of the inclined conveyor, the belt load per unit length and friction characteristics of the conveyor. The controller 22 may also be programmed to perform various diagnostic and monitoring functions and provide an indication of one or more conditions relating to assembly 10.

A releasable backstopping clutch assembly 10 in accordance with the present invention represents a significant improvement relative to conventional assemblies. In particular, the inventive assembly 10 includes means for monitoring the release of clutch 14 and recoupling clutch 14 and support structure 16 in the event continued release would create a safety concern and/or risk damage to clutch 14 or components of a surrounding system in which clutch is used. As a result, the benefits of a releasable backstopping clutch (e.g., system serviceability) may be realized while reducing the safety risks.

While the invention has been shown and described with reference to one or more particular embodiments thereof, it will be understood by those of skill in the art that various changes and modifications can be made without departing from the spirit and scope of the invention. For example, although the illustrated embodiment illustrates the inner member as coupled to the driven member 12 and the outer member releasably coupled to the support structure, the outer member of the clutch may alternatively be coupled to the driven member with the inner member releasably coupled to the support structure.

We claim:

1. A releasable backstopping clutch assembly, comprising:
a backstopping clutch comprising:
an inner member;
an outer member disposed radially outwardly of said inner member; and,
a torque transmission member disposed between said inner and outer members, one of said inner and outer members freely rotatable relative to another of said inner and outer members in a first rotational direction, said torque transmission member configured to engage said another member and inhibit rotation of said one member relative to said another member in a second rotational direction;
a support structure fixed against rotation and releasably coupled to said another member of said backstopping clutch, said support structure inhibiting rotation of said another member in said second rotational direction when coupled to said another member and permitting rotation of said another member in said second rotational direction when uncoupled from said another member;
a sensor configured to generate a signal indicative of a characteristic associated with movement of said another member of said backstopping clutch in said second rotational direction; and
a controller configured to cause coupling of said support structure and said another member if said characteristic meets a predetermined condition.

2. The assembly of claim 1, further comprising:
a disc coupled to said another member; and,
a caliper coupled to said support structure and configured for selective engagement with said disc.

3. The assembly of claim 2 wherein said caliper is disengaged from said disc in response to fluid pressure.

4. The assembly of claim 1 wherein said support structure is uncoupled from said another member responsive to fluid pressure.

5. The assembly of claim 4, further comprising a valve controlling delivery of said fluid pressure.

6. The assembly of claim 5 wherein said controller controls a position of said valve responsive to said signal.

7. The assembly of claim 1 wherein one of said another member and a structure coupled to said another member includes a plurality of teeth, said sensor generating said signal responsive to movement of said teeth in said second rotational direction.

8. The assembly of claim 1 wherein said characteristic comprises a speed of said another member.

9. The assembly of claim 1 wherein said characteristic comprises a position of said another member.

10. The assembly of claim 1 wherein said support structure comprises a torque arm.

11. The assembly of claim 1 wherein said torque transmission member comprises a roller.

12. The assembly of claim 1 wherein said torque transmission member comprises a sprag.

13. A releasable backstopping clutch assembly, comprising:
a backstopping clutch comprising:
an inner member;
an outer member disposed radially outwardly of said inner member; and,
a torque transmission member disposed between said inner and outer members, one of said inner and outer members freely rotatable relative to another of said inner and outer members in a first rotational direction, said torque transmission member configured to engage said another member and inhibit rotation of said one member relative to said another member in a second rotational direction;

a support structure fixed against rotation and releasably coupled to said another member of said backstopping clutch;

a disc coupled to said another member; and, a caliper coupled to said support structure, and configured for selective engagement with said disc to couple said support structure and said another member and inhibit rotation of said another member in said second rotational direction, said caliper disengaged from said disc responsive to fluid pressure to uncouple said support structure from said another member and permit rotation of said another member in said second rotational direction;

a valve controlling delivery of said fluid pressure;

a sensor configured to generate a signal indicative of a characteristic associated with movement of said another member of said backstopping clutch in said second rotational direction; and a controller controlling a position of said valve responsive to said signal to inhibit delivery of said fluid pressure if said characteristic meets a predetermined condition.

14. The assembly of claim 13 wherein one of said another member and a structure coupled to said another member includes a plurality of teeth, said sensor generating said signal responsive to movement of said teeth in said second rotational direction.

15. The assembly of claim 13 wherein said characteristic comprises a speed of said another member.

16. The assembly of claim 13 wherein said characteristic comprises a position of said another member.

17. The assembly of claim 13 wherein said support structure comprises a torque arm.

18. The assembly of claim 13 wherein said torque transmission member comprises a roller.

19. The assembly of claim 13 wherein said torque transmission member comprises a sprag.

* * * * *